(12) United States Patent
Tanimoto et al.

(10) Patent No.: US 10,504,254 B2
(45) Date of Patent: Dec. 10, 2019

(54) PREDICTOR VISUALIZATION SYSTEM, PREDICTOR VISUALIZATION METHOD, AND PREDICTOR VISUALIZATION PROGRAM

(71) Applicant: NEC Corporation, Tokyo (JP)

(72) Inventors: Akira Tanimoto, Tokyo (JP); Yousuke Motohashi, Tokyo (JP); Hiroki Nakatani, Tokyo (JP); Hiroshi Kitajima, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 58 days.

(21) Appl. No.: 15/556,490

(22) PCT Filed: Mar. 23, 2015

(86) PCT No.: PCT/JP2015/001610
§ 371 (c)(1),
(2) Date: Sep. 7, 2017

(87) PCT Pub. No.: WO2016/151616
PCT Pub. Date: Sep. 29, 2016

(65) Prior Publication Data
US 2018/0075630 A1    Mar. 15, 2018

(51) Int. Cl.
*G06T 11/20* (2006.01)
*G06N 99/00* (2019.01)
(Continued)

(52) U.S. Cl.
CPC .............. *G06T 11/206* (2013.01); *G06N 5/04* (2013.01); *G06N 99/00* (2013.01); *G06Q 10/04* (2013.01);
(Continued)

(58) Field of Classification Search
CPC ...... G06T 11/206; G06T 11/20; G06F 3/0481; G06F 17/246; H04L 41/22
(Continued)

(56) References Cited

U.S. PATENT DOCUMENTS 8,214,308 B2* 7/2012 Chu ........................ G06N 20/00
706/14
2012/0323630 A1* 12/2012 Short ................... G06Q 10/063
705/7.29
(Continued)

FOREIGN PATENT DOCUMENTS

JP    10-074188 A    3/1998

OTHER PUBLICATIONS

SAS Institute Inc., "SAS Model Manager", [online], [searched on Jan. 26, 2015], Internet <URL: http://www.sas.com/ja_jp/software/analytics/manager.html>, 4 pages.
(Continued)

*Primary Examiner* — Gordon G Liu
(74) *Attorney, Agent, or Firm* — Sughrue Mion, PLLC

(57) ABSTRACT

A storage unit 81 stores information associating each of a plurality of prediction targets with a predictor-related index related to a predictor for predicting the prediction target. Scatter graph generation means 82 generates, based on the information stored in the storage unit 81, a scatter graph in which a symbol representing the prediction target of the predictor is located at a position determined by the predictor-related index in a coordinate space where the predictor-related index is defined as at least one dimension.

14 Claims, 9 Drawing Sheets

(51) Int. Cl.
*G06Q 10/04* (2012.01)
*G06Q 30/02* (2012.01)
*G06N 5/04* (2006.01)
*G06F 3/0482* (2013.01)

(52) U.S. Cl.
CPC ......... *G06Q 30/02* (2013.01); *G06Q 30/0202* (2013.01); *G06F 3/0482* (2013.01)

(58) Field of Classification Search
USPC ........................................................ 345/440
See application file for complete search history.

(56) References Cited

U.S. PATENT DOCUMENTS

| | | | |
|---|---|---|---|
| 2013/0024167 A1 | 1/2013 | Blair et al. | |
| 2014/0198105 A1* | 7/2014 | Gibson | G06T 11/206 |
| | | | 345/440 |

OTHER PUBLICATIONS

International Search Report of PCT/JP2015/001610 dated Jun. 23, 2015 [PCT/ISA/210].
International Preliminary Report on Patentability of PCT/JP2015/001610 dated Feb. 17, 2016 [PCT/IPEA/409].

\* cited by examiner

FIG. 1

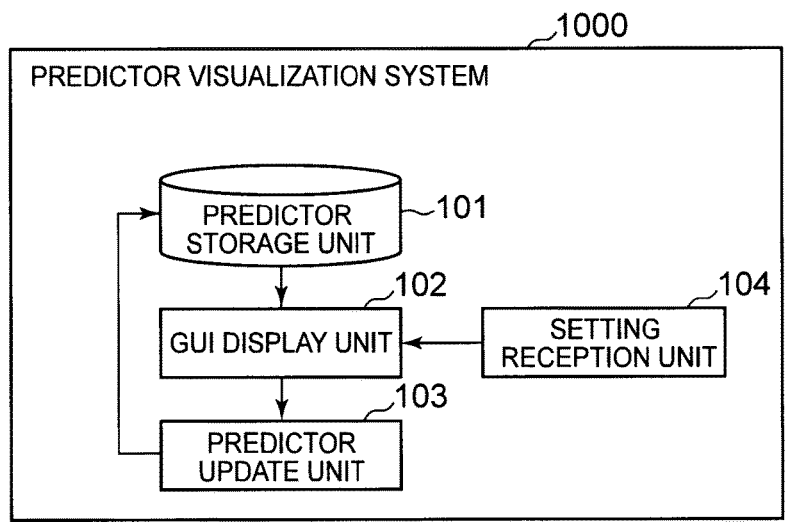

FIG. 2

| PREDICTOR ID | PREDICTION TARGET (DEMAND/DAY) | ERROR MEAN (FEBRUARY 2015) | ERROR VARIANCE (FEBRUARY 2015) | UPDATE FREQUENCY (TIMES/MONTH) (FEBRUARY 2015) | AVERAGE SALES AMOUNT IN FEBRUARY 2015 (YEN/DAY) |
|---|---|---|---|---|---|
| PREDICTOR 1 | SALMON ONIGIRI | 1 | 1 | 1 | 10234 |
| PREDICTOR 2 | UME ONIGIRI | -1 | 4 | 8 | 9987 |
| PREDICTOR 3 | KOMBU ONIGIRI | 0 | 2 | 2 | 7700 |
| PREDICTOR 4 | SPORTS DRINK 1 | 3 | 3 | 5 | 3444 |
| PREDICTOR 5 | SPORTS DRINK 2 | 7 | 6 | 1 | 4522 |
| PREDICTOR 6 | CARBONATED BEVERAGE 1 | -2 | 2 | 0 | 98876 |
| PREDICTOR 7 | ORANGE JUICE 1 | 1 | 7 | 3 | 2199 |
| PREDICTOR 8 | MELON PAN | 1 | 3 | 6 | 29091 |
| PREDICTOR 9 | CURRY PAN | -2 | 4 | 8 | 23221 |
| PREDICTOR 10 | ANPAN | -4 | 1 | 3 | 34321 |
| PREDICTOR 11 | WHITE BREAD | 3 | 2 | 5 | 19887 |
| PREDICTOR 12 | INSTANT NOODLE 1 | 5 | 5 | 6 | 99765 |
| PREDICTOR 13 | INSTANT NOODLE 2 | 2 | 0 | 1 | 10198 |
| PREDICTOR 14 | INSTANT NOODLE 3 | -5 | 3 | 1 | 12340 |
| PREDICTOR 15 | INSTANT NOODLE 4 | 1 | 1 | 1 | 3245 |
| PREDICTOR 16 | BALLPOINT PEN | -1 | 2 | 2 | 3421 |
| PREDICTOR 17 | PENCIL | 0 | 3 | 3 | 3415 |
| PREDICTOR 18 | ERASER | 3 | 1 | 3 | 2341 |
| PREDICTOR 19 | NOTEBOOK | 2 | 2 | 4 | 2341 |
| PREDICTOR 20 | STICKY NOTE | 4 | 3 | 4 | 3123 |
| PREDICTOR 21 | WHISKEY | -2 | 4 | 3 | 5674 |

FIG. 3

| PREDICTOR ID = 1 PREDICT SALES QUANTITY OF SALMON ONIGIRI |||||||
|---|---|---|---|---|---|---|
| DATE | DAY OF WEEK | PREDICTED VALUE (NUMBER) | ACTUAL VALUE (NUMBER) | PREDICTOR UPDATE | UPDATE METHOD | REASON FOR UPDATE |
| 1/2/2015 | SUN | 171 | 170 | | | |
| 2/2/2015 | MON | 32 | 32 | | | |
| 3/2/2015 | TUE | 43 | 42 | | | |
| 4/2/2015 | WED | 33 | 34 | | | |
| 5/2/2015 | THU | 55 | 52 | | | |
| 6/2/2015 | FRI | 33 | 33 | | | |
| 7/2/2015 | SAT | 166 | 170 | | | |
| 8/2/2015 | SUN | 151 | 151 | | | |
| 9/2/2015 | MON | 42 | 41 | | | |
| 10/2/2015 | TUE | 54 | 55 | UPDATED | AUTOMATIC | PERIODIC MAINTENANCE |
| 11/2/2015 | WED | 66 | 67 | | | |
| 12/2/2015 | THU | 52 | 52 | | | |
| 13/2/2015 | FRI | 46 | 43 | | | |
| 14/2/2015 | SAT | 181 | 182 | | | |
| 15/2/2015 | SUN | 133 | 133 | | | |
| ... | ... | ... | ... | ... | ... | ... |

FIG. 4

| PREDICTOR ID | STORE | PREDICTION TARGET (DEMAND/DAY) | ERROR MEAN ABSOLUTE VALUE (FEBRUARY 2015) |
|---|---|---|---|
| PREDICTOR A1 | STORE A | CARBONATED BEVERAGE 1 | 1 |
| PREDICTOR A2 | STORE A | CARBONATED BEVERAGE 2 | 0 |
| PREDICTOR A3 | STORE A | INSTANT NOODLE 1 | 1 |
| PREDICTOR A4 | STORE A | ERASER | 2 |
| PREDICTOR B1 | STORE B | CARBONATED BEVERAGE 1 | 2 |
| PREDICTOR B2 | STORE B | CARBONATED BEVERAGE 2 | 0 |
| PREDICTOR B3 | STORE B | INSTANT NOODLE 1 | 0 |
| PREDICTOR B4 | STORE B | ERASER | 1 |
| PREDICTOR C1 | STORE C | CARBONATED BEVERAGE 1 | 8 |
| PREDICTOR C2 | STORE C | CARBONATED BEVERAGE 2 | 11 |
| PREDICTOR C3 | STORE C | INSTANT NOODLE 1 | 0 |
| PREDICTOR C4 | STORE C | ERASER | 2 |
| PREDICTOR D1 | STORE D | CARBONATED BEVERAGE 1 | 1 |
| PREDICTOR D2 | STORE D | CARBONATED BEVERAGE 2 | 2 |
| PREDICTOR D3 | STORE D | INSTANT NOODLE 1 | 1 |
| PREDICTOR D4 | STORE D | ERASER | 1 |
| ... | ... | ... | ... |

| PREDICTION TARGET (DEMAND/DAY) | PREDICTOR ID | ERROR VARIANCE (FEBRUARY 2015) | UPDATE FREQUENCY (TIMES/MONTH) (FEBRUARY 2015) | AVERAGE SALES AMOUNT IN FEBRUARY 2015 (YEN/DAY) |
|---|---|---|---|---|
| ... | | | | |
| INSTANT NOODLE 4 | PREDICTOR 15 | 1 | 1 | 3245 |
| SALMON ONIGIRI | PREDICTOR 1 | 1 | 1 | 10234 |
| KOMBU ONIGIRI | PREDICTOR 3 | 2 | 2 | 7700 |
| BALLPOINT PEN | PREDICTOR 16 | 2 | 2 | 3421 |
| ... | | | | |

PREDICTOR VISUALIZATION SYSTEM, PREDICTOR VISUALIZATION METHOD, AND PREDICTOR VISUALIZATION PROGRAM

CROSS REFERENCE TO RELATED APPLICATIONS

This application is a National Stage of International Application No. PCT/JP2015/001610, filed Mar. 23, 2015, the contents of which are incorporated herein by reference in its entirety.

TECHNICAL FIELD

The present invention relates to a predictor visualization system, predictor visualization method, and predictor visualization program for visualizing a large number of predictors.

BACKGROUND ART

A predictor is information representing the correlation between an explanatory variable and a response variable. For example, the predictor is a component for predicting the result of the prediction target by calculating the response variable based on the explanatory variable. The predictor is generated by a learner, with learning data for which the value of the response variable has already been obtained and given parameters as input. The predictor may be expressed by, for example, a function c that maps an input x to a correct solution y. The predictor may predict the numerical value of the prediction target, or the label of the prediction target. The predictor may output a variable describing the probability distribution of the response variable. The predictor is also referred to as "model", "learning model", "prediction model", "analytical model", "prediction expression", or the like.

Predictors degrade in prediction accuracy due to environmental changes or with the passage of time. Proper maintenance of predictors is therefore required for their appropriate, long-term operation.

Non Patent Literature (NPL) 1 describes a tool (SAS® Model Manager) for efficient generation, management, and arrangement of analytical models such as prediction models (predictors). For example in the case where scoring results change over time, the tool described in NPL 1 performs automatic alert notification that models (predictors) have degraded.

CITATION LIST

Non Patent Literature

NPL 1: SAS Institute Inc., "SAS Model Manager", [online], [searched on Jan. 26, 2015], Internet <URL: http://www.sas.com/ja_jp/software/analytics/manager.html>

SUMMARY OF INVENTION

Technical Problem

In the case where the number of predictors to be managed is small, it is possible to recognize and manage the state of each predictor by individually monitoring its accuracy degradation and the like. In the case where the number of predictors to be managed is large, however, it is virtually impossible to individually monitor the state of each predictor. For example, the tool described in NPL 1 does not provide any function of efficiently managing a large number of predictors, and so cannot be used to appropriately manage a large number of predictors.

Besides, for example in the case of automatically notifying model (predictor) degradation as described in NPL 1, if the number of predictors to be managed is large, a large number of degradation notifications are expected to be made. This requires an administrator to deal with each individual notification, and hinders efficient management.

For appropriate maintenance of a large number of predictors, it is preferable that the statuses of a large number of predictors are easily recognizable to an administrator at a glance, unlike a maintenance method for each individual predictor.

The present invention accordingly has an object of providing a predictor visualization system, predictor visualization method, and predictor visualization program that can visualize the statuses of a large number of predictors in an easily recognizable manner.

Solution to Problem

A predictor visualization system according to the present invention includes: a storage unit which stores information associating each of a plurality of prediction targets with a predictor-related index related to a predictor for predicting the prediction target; and scatter graph generation means which generates, based on the information stored in the storage unit, a scatter graph in which a symbol representing the prediction target of the predictor is located at a position determined by the predictor-related index in a coordinate space where the predictor-related index is defined as at least one dimension.

Another predictor visualization system according to the present invention includes: a storage unit which stores information associating each of a plurality of predictors with a predictor-related index related to the predictor; and scatter graph generation means which generates, based on the information stored in the storage unit, a scatter graph in which a symbol representing the predictor is located at a position determined by the predictor-related index in a coordinate space where the predictor-related index is defined as at least one dimension.

A predictor visualization method according to the present invention includes generating, based on information that is stored in a storage unit and associates each of a plurality of prediction targets with a predictor-related index related to a predictor for predicting the prediction target, a scatter graph in which a symbol representing the prediction target of the predictor is located at a position determined by the predictor-related index in a coordinate space where the predictor-related index is defined as at least one dimension.

Another predictor visualization method according to the present invention includes generating, based on information that is stored in a storage unit and associates each of a plurality of predictors with a predictor-related index related to the predictor, a scatter graph in which a symbol representing the predictor is located at a position determined by the predictor-related index in a coordinate space where the predictor-related index is defined as at least one dimension.

A predictor visualization program according to the present invention causes a computer to execute a scatter graph generation process of generating, based on information that is stored in a storage unit and associates each of a plurality of prediction targets with a predictor-related index related to a predictor for predicting the prediction target, a scatter graph in which a symbol representing the prediction target of the predictor is located at a position determined by the predictor-related index in a coordinate space where the predictor-related index is defined as at least one dimension.

Another predictor visualization program according to the present invention causes a computer to execute a scatter graph generation process of generating, based on information that is stored in a storage unit and associates each of a plurality of predictors with a predictor-related index related to the predictor, a scatter graph in which a symbol representing the predictor is located at a position determined by the predictor-related index in a coordinate space where the predictor-related index is defined as at least one dimension.

Advantageous Effects of Invention

According to the present invention, the statuses of a large number of predictors can be visualized in an easily recognizable manner.

BRIEF DESCRIPTION OF DRAWINGS

FIG. 1 is a block diagram depicting an example of the structure of Exemplary Embodiment 1 of a predictor visualization system according to the present invention.

FIG. 2 is an explanatory diagram depicting an example of information stored in a predictor storage unit.

FIG. 3 is an explanatory diagram depicting an example of information stored in the predictor storage unit.

FIG. 4 is an explanatory diagram depicting an example of information stored in the predictor storage unit.

DESCRIPTION OF EMBODIMENT

Figure 5:
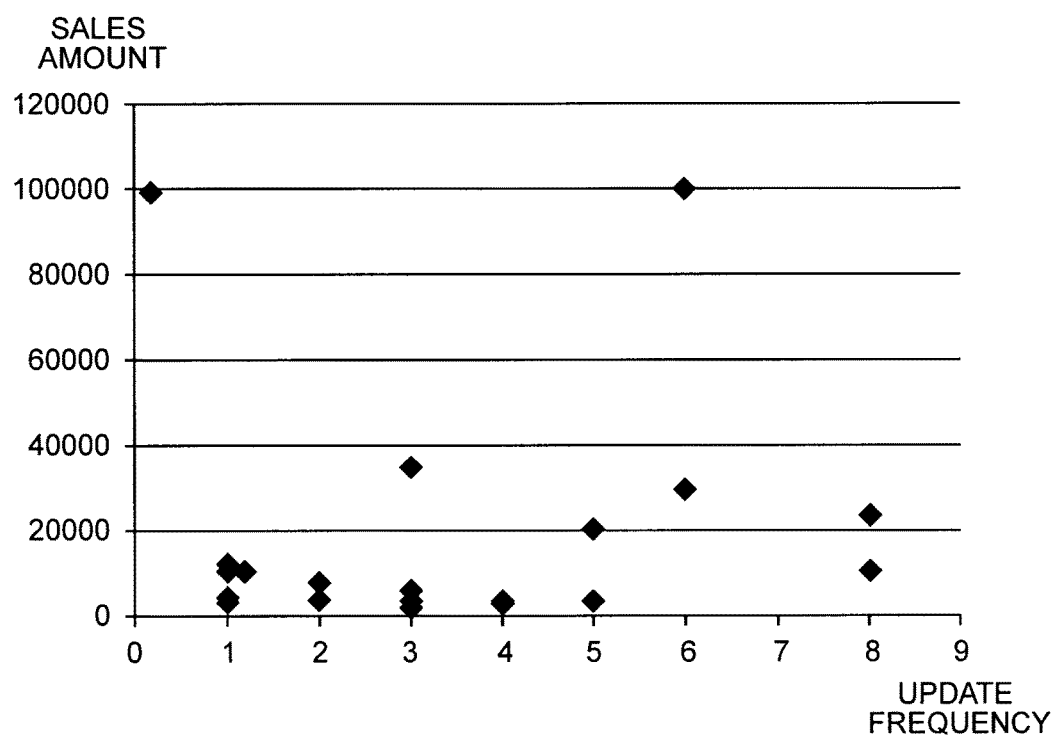
FIG. 5 is an explanatory diagram depicting an example of a scatter graph.

The following describes exemplary embodiments of the present invention with reference to drawings.

Exemplary Embodiment 1

FIG. 1 is a block diagram depicting an example of the structure of Exemplary Embodiment 1 of a predictor visualization system according to the present invention. A predictor visualization system 1000 in this exemplary embodiment is a system that performs prediction or prediction using a large number of predictors (prediction expressions). Thus, the predictor visualization system 1000 in this exemplary embodiment also performs prediction or prediction, and so can be referred to as a prediction system or a prediction system.

The predictor visualization system 1000 in this exemplary embodiment is described below using a retailer as an example, to facilitate understanding. For example, the predictor visualization system 1000 predicts the demand (i.e. sales quantity) of products displayed in retail stores using predictors, for each store and product. The predictor visualization system 1000 has a predictor for each store and product. In other words, the predictor visualization system 1000 has the same number of predictors as the number obtained by multiplying the number of stores and the number of product types.

The predictor visualization system 1000 in this exemplary embodiment includes a predictor storage unit 101, a graphical user interface (GUI) display unit 102, a predictor update unit 103, and a setting reception unit 104.

The predictor storage unit 101 stores a list of predictors included in the predictor visualization system 1000. The predictor storage unit 101 stores each predictor and the prediction target predicted by the predictor, in association with each other. The target of prediction by the predictor is hereafter referred to as the "prediction target of the predictor".

The predictor storage unit 101 may store an "predictor-related index" in association with the predictor. The predictor-related index is, for example, information indicating prediction accuracy such as error mean, error variance, or error mean absolute value. Other examples of the predictor-related index include the update time of the predictor, and the operation time representing the duration from the previous update to the present. Updating a predictor can be rephrased as relearning a predictor. The predictor-related index may be, for example, update frequency.

Moreover, the predictor storage unit 101 may store a "prediction target-related index" in association with the predictor. For example, the predictor storage unit 101 may store, as the "prediction target-related index", the ordinal rank of the prediction target indicating importance or priority or result information indicating sales amount, profit, sales ratio, or the like, in association with the prediction target. In the case where the predictor visualization system 1000 has a predictor for each store and product, the predictor storage unit 101 may store information for identifying the store, in association with the prediction target. The "prediction target-related index" is, for example, the update frequency or update history of the predictor for predicting the prediction target. An index related to predictor updating may be managed as the "predictor-related index" or the "prediction target-related index".

One example of the prediction target-related index is the importance of the prediction target. For example, suppose there are a plurality of predictors for predicting the degradation of parts constituting a structure such as a concrete bridge or a tunnel. In this case, the importance is a value indicating how the part which is the prediction target is important in the structure (e.g. the degree of danger when the part has degraded).

Another example of the prediction target-related index is the priority of the prediction target. For example, suppose there are predictors for predicting the performance of a plurality of modules included in a computer system. Also suppose the operational rule for the predicted value of the performance of a module 1 is defined as "immediately escalate to the president if the value is less than a predetermined threshold", the operational rule for the predicted value of the performance of a module 2 is defined as "telephone to the system administrator if the value is less than a predetermined threshold", and the operational rule for the predicted value of the performance of a module 3 is defined as "notify the administrator by e-mail if the value is less than a predetermined threshold". In this case, for example, the priority levels are module 1>module 2>module 3.

FIG. 2 is an explanatory diagram depicting an example of information stored in the predictor storage unit 101. In the example depicted in FIG. 2, the predictor storage unit 101 associates a predictor (prediction expression) with each product of a store, and stores the error mean and error variance indicating the performance of the predictor, the update frequency of the predictor, and the sales amount of the prediction target. Each predictor in FIG. 2 may also be referred to as "prediction expression".

For example, a predictor 1 in FIG. 2 is a predictor for predicting the demand (sales quantity) of salmon onigiri (rice ball), where the monthly prediction error mean is +1, the monthly prediction error variance is 1, the monthly predictor update frequency is 1, and the average sales amount of the prediction target (salmon onigiri) per day is 10234 yen.

The predictor storage unit 101 may store more detailed information for each predictor. FIG. 3 is an explanatory diagram depicting more detailed information of the predictor 1 in FIG. 2. As depicted in FIG. 3, the predictor storage unit 101 may store information associating the predictor, the predicted value by the predictor, and the actual value corresponding to the predicted value. The information depicted in FIG. 3 associates, for each day, the predicted value (the predicted value of the sales quantity of salmon onigiri by the predictor 1 in FIG. 2, the actual value (how many salmon onigiri were actually sold) corresponding to the predicted value, and whether or not the predictor 1 was updated on that day. Furthermore, the predictor storage unit 101 may store, for each update timing of the predictor, information indicating whether the predictor was automatically or manually updated and information indicating the reason for updating the predictor, as depicted in FIG. 3. The predictor visualization system 1000 may, for example, have a structure of calculating the values such as the error mean, the error variance, and the predictor update frequency depicted in FIG. 2 based on the information depicted in FIG. 3.

Although FIG. 2 depicts an example where the predictor storage unit 101 manages the predictor-related index (or indexes) and the prediction target-related index (or indexes) in one table, the predictor-related index and the prediction target-related index may be managed in separate tables.

FIG. 4 is an explanatory diagram depicting another example of information stored in the predictor storage unit 101. In the example depicted in FIG. 4, the predictor storage unit 101 associates a predictor (prediction expression) with each store and product (prediction target), and stores the error mean absolute value indicating the performance of the predictor.

The predictor storage unit 101 may, for example, separately store a first table associating the prediction target with the predictor-related index and a second table associating the prediction target with the prediction target-related index. An example of the second table is a table associating each product with the sales of the product, such as point of sales (POS) data. In this case, the predictor storage unit 101 may be realized by a plurality of devices storing the respective tables. The predictor storage unit 101 is, for example, a magnetic disk device.

The GUI display unit 102 visualizes the information stored in the predictor storage unit 101. In detail, the GUI display unit 102 generates a scatter graph in which a symbol representing the prediction target of each predictor is located in a coordinate space, based on the information stored in the predictor storage unit 101. Here, the symbol representing the prediction target of each predictor is located in such a coordinate space where a predictor-related index is defined as at least one dimension.

FIG. 5 is an explanatory diagram depicting an example of the scatter graph generated by the GUI display unit 102. The scatter graph depicted in FIG. 5 is generated based on the information depicted in FIG. 2. In the example depicted in FIG. 5, the predictor update frequency which is a predictor-related index is defined in the horizontal dimensional axis, and the sales amount which is a prediction target-related index is defined in the vertical dimensional axis in the coordinate space. One symbol in a diamond shape in FIG. 5 represents one prediction target (predictor) in the coordinate space.

Although FIG. 5 depicts an example where a prediction target-related index is defined in the vertical axis, a predictor-related index (such as error mean or error distribution indicating performance) may be defined in the vertical axis. Although FIG. 5 depicts an example where a predictor-related index is defined in the horizontal axis, the predictor-related index may be defined in the vertical axis.

Figure 6:
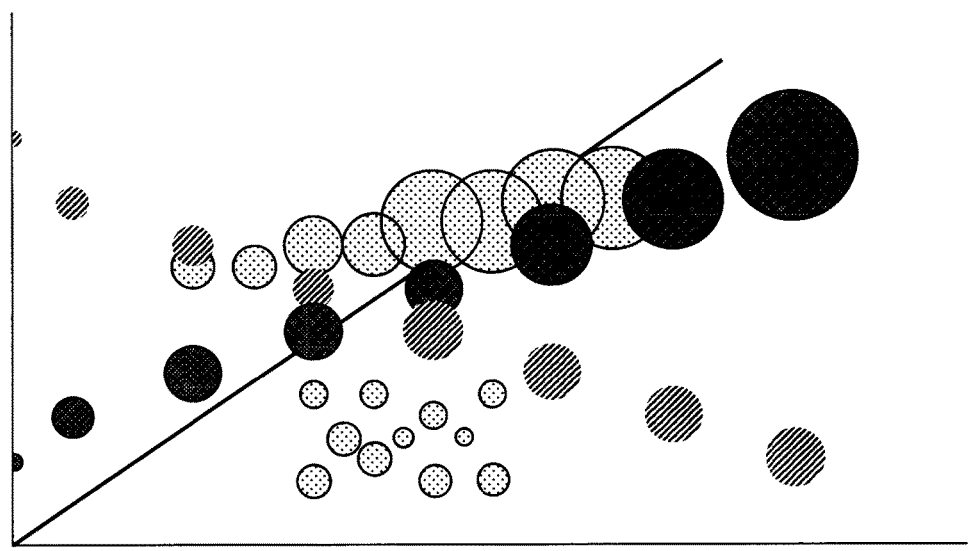
FIG. 6 is an explanatory diagram depicting another example of the scatter graph.

Although FIG. 5 depicts an example where the GUI display unit 102 generates a two-dimensional scatter graph, the scatter graph generated is not limited to two dimensions. FIG. 6 is an explanatory diagram depicting another example of the scatter graph generated by the GUI display unit 102. The GUI display unit 102 may generate a multidimensional scatter graph of three or more dimensions as depicted in FIG. 6.

Figure 7:
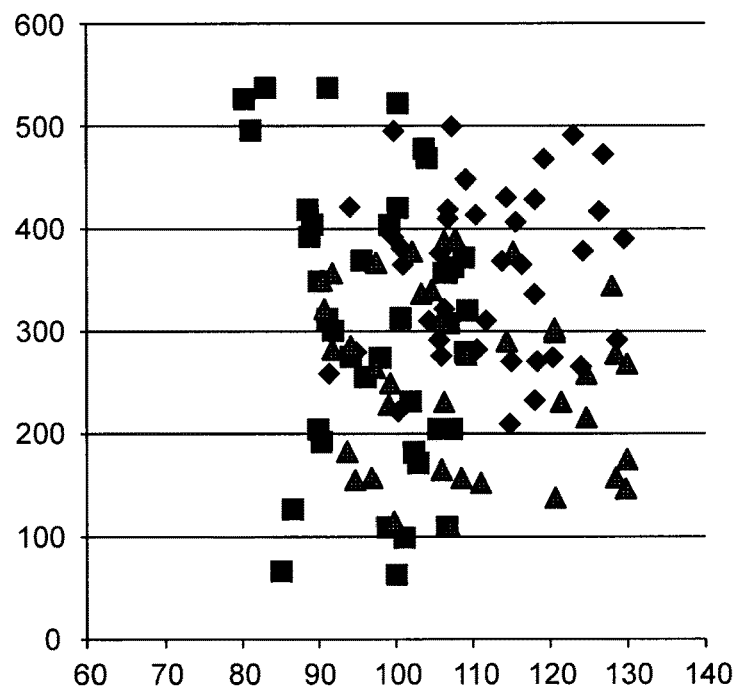
FIG. 7 is an explanatory diagram depicting yet another example of the scatter graph.

Although FIG. 5 depicts an example where the GUI display unit 102 generates the scatter graph in which the symbol representing each prediction target has the same shape in the coordinate space, the GUI display unit 102 may arrange, in the coordinate space, the symbol changed depending on information related to the prediction target. FIG. 7 is an explanatory diagram depicting yet another example of the scatter graph generated by the GUI display unit 102. In the example depicted in FIG. 7, the GUI display unit 102 generates such a scatter graph in which not only diamond symbols but also rectangular symbols and triangular symbols are arranged in a coordinate space.

For example, the GUI display unit 102 may express the type or classification of each prediction target by symbol shape or color. In detail, in the case where the prediction targets are classified in categories such as "beverage", "food", and "commodity", the GUI display unit 102 may change the color or shape of the symbol representing each prediction target depending on the category to which the prediction target belongs. The GUI display unit 102 may express quantity information related to each prediction target by symbol size or color. The same applies to the predictor-related index.

The index assigned to each dimensional axis of the scatter graph depicted in each of FIGS. 5 to 7 may be a predetermined index, or any index set by an operator via the below-mentioned setting reception unit 104.

In the scatter graph depicted in FIG. 5, the symbols representing the prediction targets of just 21 predictors are arranged in the coordinate space. However, as the number of stores and the number of products increase, the number of prediction targets increases significantly. In this exemplary embodiment, the GUI display unit 102 generates the scatter graph in which the symbols representing the prediction targets are arranged in such a coordinate space that has a predictor-related index or a prediction target-related index as one dimension. Therefore, even when the number of prediction targets increases, the tendency of the distribution of the prediction targets is recognizable at a glance. Thus, the statuses of a large number of predictors can be recognized easily.

For example, the operator can recognize at a glance the tendency of the distribution of such predictors with low sales amount of prediction targets despite high update frequency or predictors with low update frequency despite high sales amount of prediction targets.

The GUI display unit 102 displays the generated scatter graph. The GUI display unit 102 may display the generated scatter graph by itself, or cause another display device (not depicted) such as a display to display the scatter graph.

The GUI display unit 102 may receive a selection operation for a symbol in the scatter graph, from the operator. In response to receiving the selection operation for the symbol, the GUI display unit 102 may display more detailed information of the prediction target represented by the selected symbol or the predictor for predicting the prediction target represented by the selected symbol. The GUI display unit 102 may, for each symbol in the generated scatter graph, set a link to detailed information of the prediction target represented by the symbol or the predictor for predicting the prediction target represented by the symbol. Such a link facilitates the display of more detailed information.

The detailed information of the prediction target or the detailed information of the predictor is, for example, the information corresponding to each row of the table in FIG. 2, or the information corresponding to the table in FIG. 3. The detailed information of the prediction target may be, for example, POS data corresponding to the prediction target represented by the selected symbol. The detailed information of the predictor may be, for example, learning data used when learning the predictor. The detailed information of the predictor may be information indicating the predictor itself, such as a mathematical formula representing the predictor.

In the case where the predictor visualization system 1000 has an automatic predictor update function, the detailed information of the predictor may be, for example, an update rule set for the predictor. The update rule is a rule that is set for each individual predictor to prescribe the timing of automatically updating the predictor. For example, the update rule is an if-then rule for automatically updating the predictor, such as "automatically update the predictor on the 10th of every month" or "automatically update the predictor if the prediction error is more than 15% for 10 consecutive days".

The predictor update unit 103 updates a predictor to be updated, and stores the updated predictor in the predictor storage unit 101. Any method may be used to update the predictor. For example, the predictor update unit 103 may regenerate the predictor based on learning data, or update the predictor based on learning data which is the difference from the previous learning.

Any method may be used to specify the predictor to be updated. For example, the predictor update unit 103 may extract a predictor that meets a predetermined condition (e.g. update frequency, prediction accuracy, etc.), and update the extracted predictor.

The GUI display unit 102 receives a selection instruction for a predictor of a prediction target in the generated scatter graph. Here, the predictor update unit 103 may specify the predictor for which the GUI display unit 102 has received the selection, as the update target. In particular, the GUI display unit 102 may receive an instruction to select a range in the scatter graph, and the predictor update unit 103 may specify each predictor in the selected range as the update target.

Figure 8:
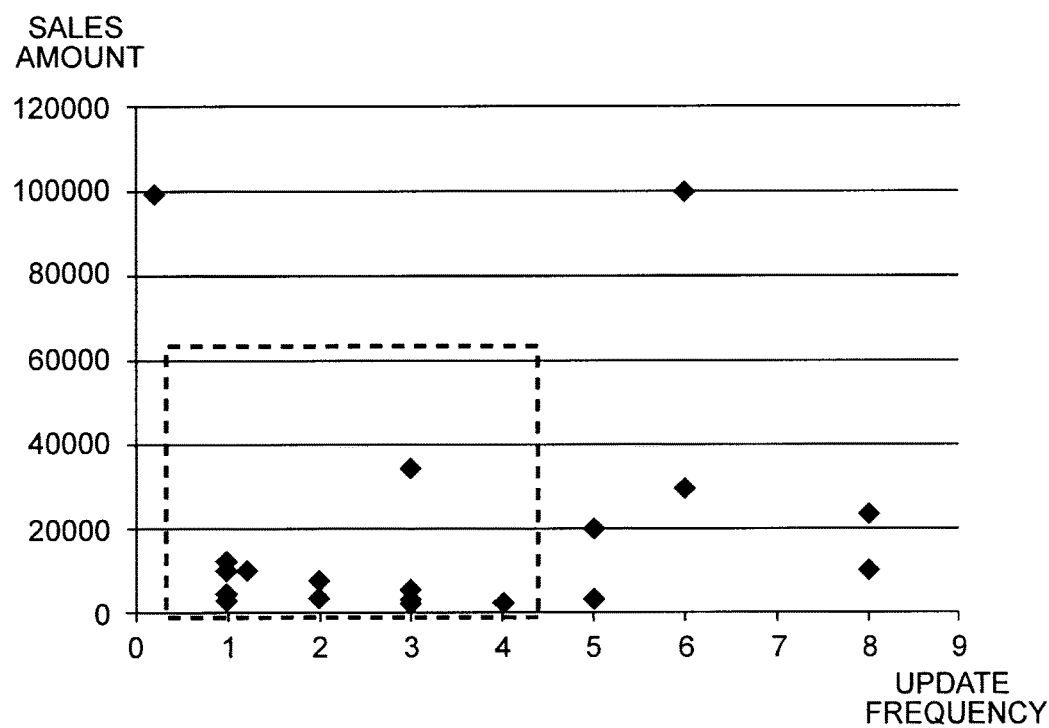
FIG. 8 is an explanatory diagram depicting an example of a state of receiving a range selection instruction for the scatter graph.

FIG. 8 is an explanatory diagram depicting an example of a state of receiving a range selection instruction for the scatter graph. In the example depicted in FIG. 8, the range indicated by the dashed line is selected as the predictors to be updated.

As an example, in the case where the scatter graph is displayed by an information processing device (not depicted) including a display and a pointing device, the predictor update unit 103 may specify a predictor selected according to an operation made from the pointing device on the scatter graph displayed on the display, as the update target. As another example, in the case where the scatter graph is displayed by a display device (not depicted) such as a touch panel, the predictor update unit 103 may specify a predictor selected according to an operation made by an operator on the touch panel, as the update target.

In this exemplary embodiment, an index highly likely to be used to determine whether or not to update a predictor is set in a dimensional axis of the scatter graph generated by the GUI display unit 102. Hence, the symbols of predictors (prediction targets) that are close to each other in the index set in the dimensional axis of the scatter graph are displayed close to each other.

In this exemplary embodiment, the GUI display unit 102 receives a range selection for the scatter graph displaying such a collection of symbols. The predictor update unit 103 then specifies each predictor in the selected range as the update target. In this way, prediction targets having the same tendency can be specified together, so that the load of the operator issuing an update instruction individually for each predictor can be reduced.

After the GUI display unit 102 receives a range selection instruction for any symbol in the scatter graph, the predictor update unit 103 may specify information related to the prediction target corresponding to each symbol in the selected range or information related to the predictor of the prediction target. The GUI display unit 102 may then output the specified information.

The setting reception unit 104 receives, when the GUI display unit 102 receives a symbol selection operation from the operator, a setting of which information is to be displayed by the GUI display unit 102, from the operator. The setting reception unit 104 may receive a setting of which information is to be linked from each symbol in the scatter graph, from the operator.

For example, the setting reception unit 104 preferably sets, as a dimension of the scatter graph, an index which the operator regards as the most important, and sets, as information displayed upon a symbol selection operation by the operator, an index which the operator regards as the second most important. This allows the operator to efficiently manage a large number of predictors.

Figure 9:
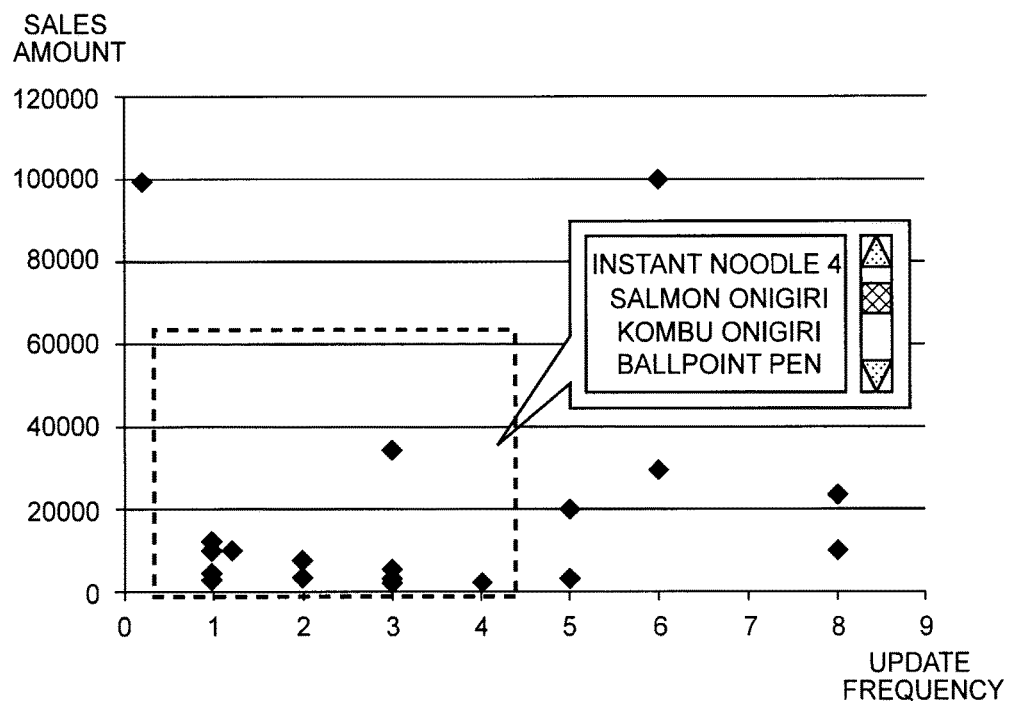
FIG. 9 is an explanatory diagram depicting an example of outputting detailed information of prediction targets and predictors on a screen.

FIG. 9 is an explanatory diagram depicting an example of outputting detailed information of prediction targets and predictors on a screen. In the example depicted in FIG. 9, the prediction targets corresponding to the symbols included in the selected range are displayed in the balloon, with the information (the prediction target name in this example) of the predictors in the selected range being presented in tabular form.

The GUI display unit 102, the predictor update unit 103, and the setting reception unit 104 are realized by a CPU in a computer operating according to a program (predictor visualization program). For example, the program may be stored in a storage unit (not depicted) in the predictor visualization system, with the CPU reading the program and, according to the program, operating as the GUI display unit 102, the predictor update unit 103, and the setting reception unit 104.

Alternatively, the GUI display unit 102, the predictor update unit 103, and the setting reception unit 104 may each be realized by dedicated hardware. The predictor visualization system according to the present invention may be composed of two or more physically separate devices that are wiredly or wirelessly connected to each other.

Figure 10:
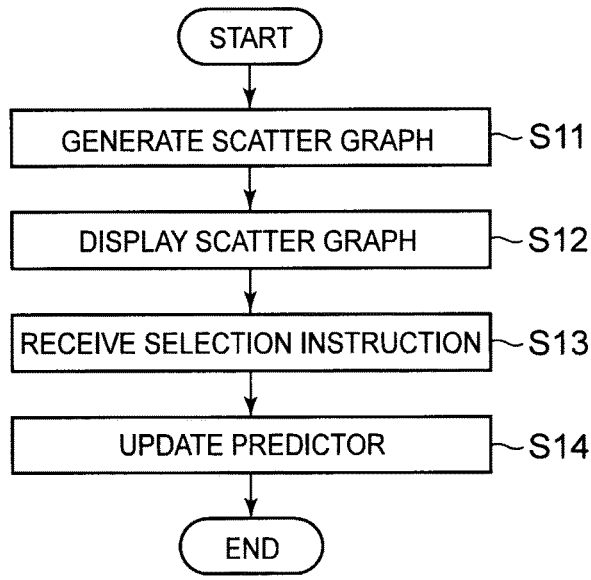
FIG. 10 is a flowchart depicting an example of the operation of the predictor visualization system in Exemplary Embodiment 1.

The following describes the operation of the predictor visualization system in this exemplary embodiment. FIG. 10 is a flowchart depicting an example of the operation of the predictor visualization system in this exemplary embodiment.

The GUI display unit 102 reads information related to predictors and prediction targets from the predictor storage unit 101, and generates a scatter graph (step S11). In detail, the GUI display unit 102 generates the scatter graph in which a symbol representing the prediction target of each predictor is located in a coordinate space where a predictor-related index is defined as at least one dimension, based on the information stored in the predictor storage unit 101.

The GUI display unit 102 displays the generated scatter graph (step S12). The GUI display unit 102 receives a selection instruction for any symbol in the scatter graph (step S13). Here, the GUI display unit 102 may receive a range selection instruction. The predictor update unit 103 updates the predictor corresponding to the selected symbol, and stores the updated predictor in the predictor storage unit 101 (step S14).

As described above, in this exemplary embodiment, based on an index related to each predictor for predicting a prediction target or the prediction target stored in the predictor storage unit 101, the GUI display unit 102 generates a scatter graph in which a symbol representing the prediction target of each predictor is located at the position determined by the predictor-related index in a coordinate space where the predictor-related index is defined as at least one dimension. The predictor-related index of the predictor for predicting the prediction target is, for example, calculated based on one or more results of the predictor which are used in the prediction of the prediction target. Thus, the statuses of a large number of predictors can be visualized in an easily recognizable manner, enabling efficient operation of a large number of predictors.

Figure 11:
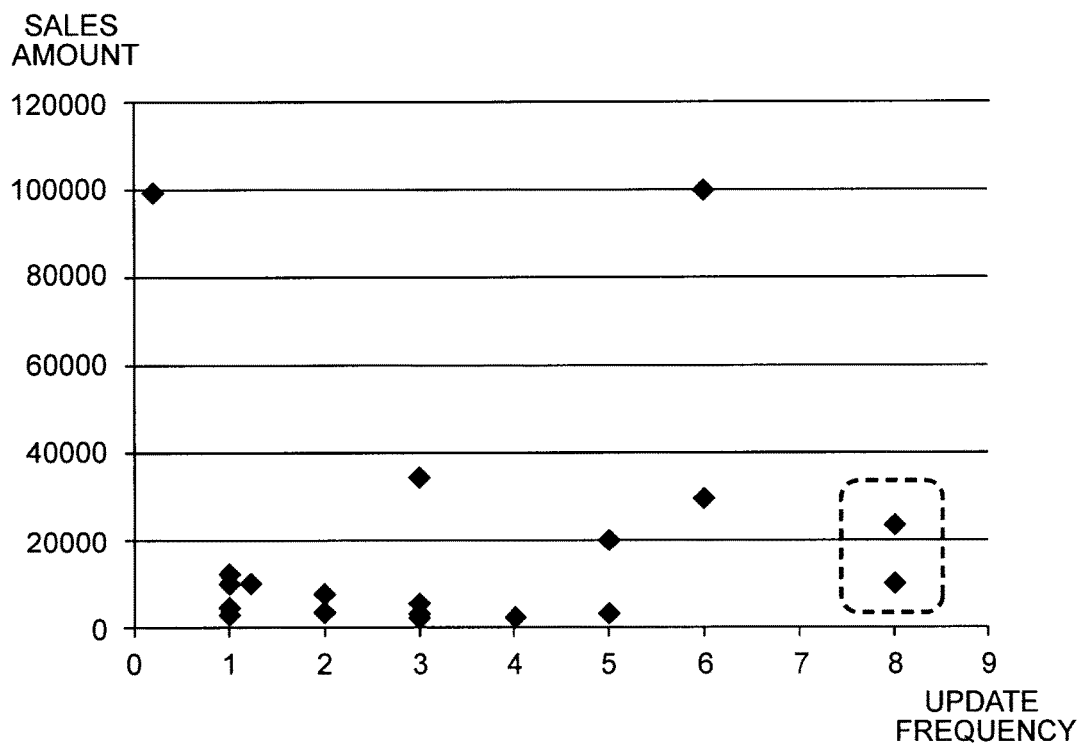
FIG. 11 is an explanatory diagram depicting an example of a scatter graph use case.

How the operator uses the scatter graph displayed by the GUI display unit 102 is described below, using two examples. FIGS. 11 to 14 are each an explanatory diagram depicting an example of the scatter graph. The first example is described below, with reference to FIG. 11. The scatter graph depicted in FIG. 11 is the same as the scatter graph depicted in FIG. 5.

Typically, updating (relearning) a predictor requires update costs. Examples of the update costs include financial costs and computer resources. For example, suppose a predictor for predicting a prediction target with low sales amount is not very important for the operator. In this case, frequently updating such a predictor for predicting a prediction target with low sales amount is not desirable for the operator. This is because frequently updating a predictor for predicting a prediction target with low sales amount means considerable update costs for an unimportant predictor.

By referencing to the scatter graph depicted in FIG. 11, the operator can notice any predictor with low sales amount of a prediction target despite high update frequency, that is, the predictors corresponding to the symbols within the dotted frame in FIG. 11. For example, having noticed such predictors, the operator checks the details of the predictors.

Figure 12:
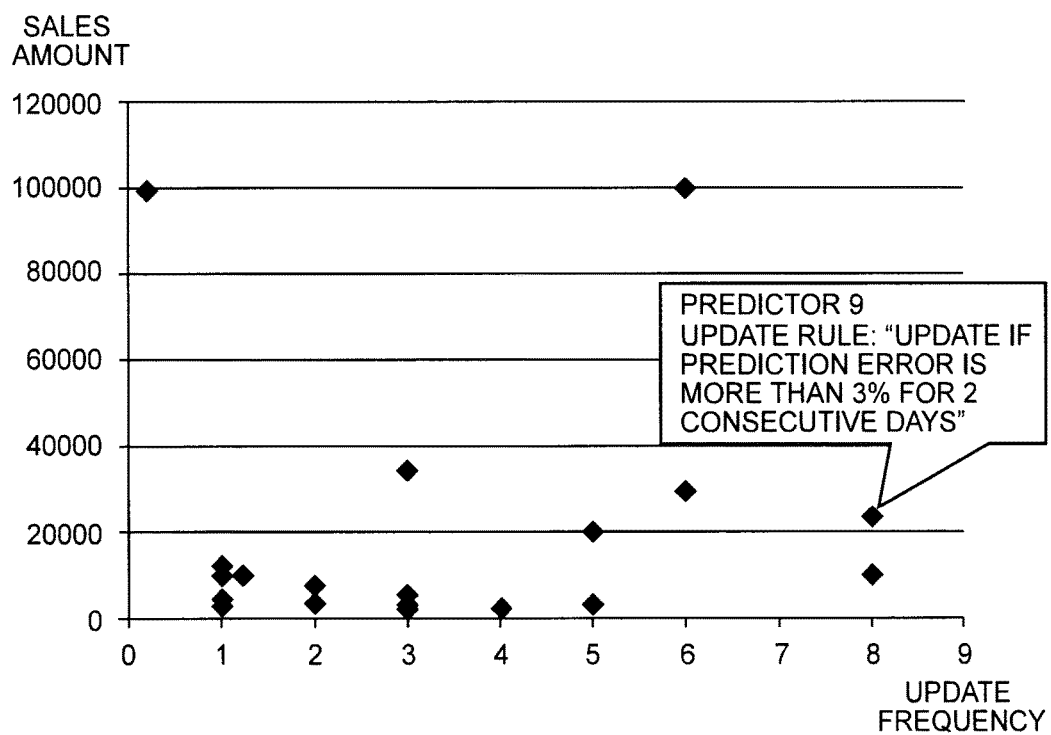
FIG. 12 is an explanatory diagram depicting an example of the scatter graph use case.

The operator selects the symbols within the dotted frame in FIG. 11, by a method such as clicking. In response to the symbol selection, the GUI display unit 102 displays information indicating the details of the prediction target represented by each selected symbol or information indicating the details of the predictor for predicting the prediction target represented by the selected symbol. Here, in response to the symbol selection, the GUI display unit 102 displays the update rule for the predictor for predicting the prediction target represented by the selected symbol. This is depicted in FIG. 12. The information output here may be, for example, set via the setting reception unit 104 or preset in the system.

The operator checks the displayed update rule. By resetting the update rule for the predictor so as to lower its update frequency, the operator can solve the problem of needless update costs for an unimportant predictor.

Figure 13:
FIG. 13 is an explanatory diagram depicting another example of the scatter graph use case.

The second example is described below, with reference to FIG. 13. The scatter graph depicted in FIG. 13 is generated based on the information depicted in FIG. 4. In the example depicted in FIG. 13, the store information of the prediction target which is a prediction target-related index is defined in the in the horizontal dimensional axis, and the prediction accuracy error mean of the predictor which is a predictor-related index is defined in the vertical dimensional axis in the coordinate space. One symbol in a diamond shape in FIG. 13 represents one prediction target (predictor) in the coordinate space.

By referencing to the scatter graph depicted in FIG. 13, the operator can notice that the prediction error of part of the products is high in a store C. For example, having noticed such predictors, the operator checks the details of the predictors.

Figure 14:
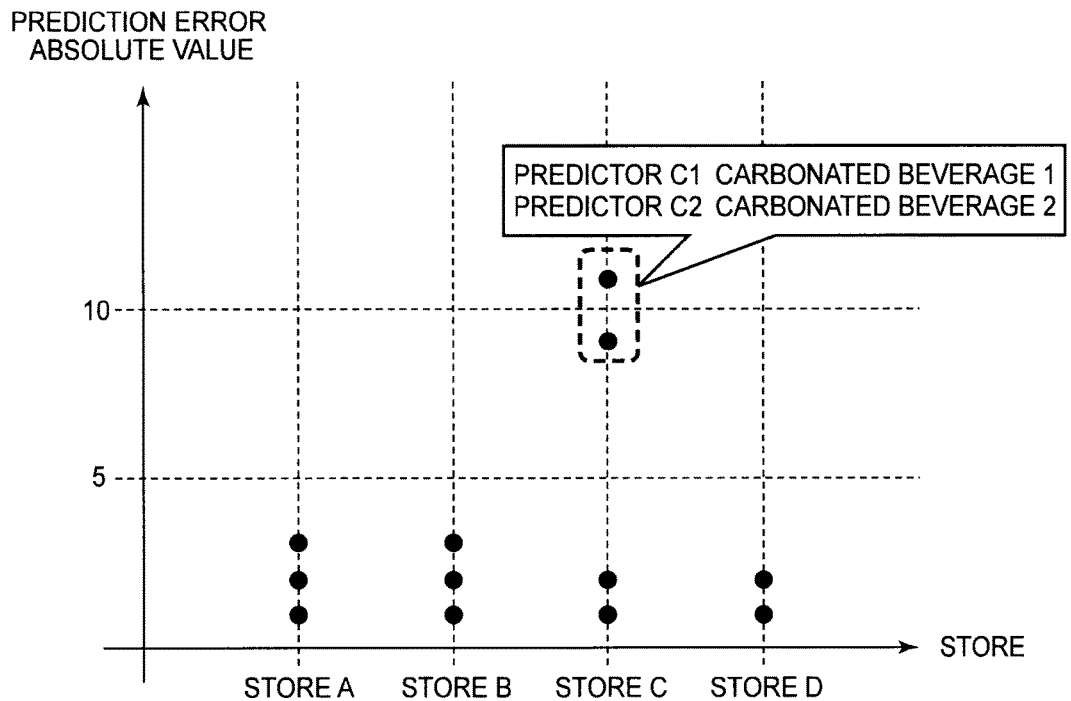
FIG. 14 is an explanatory diagram depicting another example of the scatter graph use case.

The operator selects the range of symbols within the dotted frame in FIG. 14. The GUI display unit 102 receives the range selection instruction for any symbol in the scatter graph, and then outputs information indicating the name of the prediction target corresponding to each symbol within the selected range. This is depicted in FIG. 14. The information output here may be, for example, set via the setting reception unit 104 or preset in the system.

By referencing to the screen depicted in FIG. 14, the operator can recognize that the products with high prediction error in the store C are all carbonated beverages. The operator investigates the reason why the prediction error of the demand of these carbonated beverages is high in the store C. For example, suppose the operator has found out, as a result of the investigation, that the store C mounted a unique campaign for these carbonated beverages. Also suppose the operator has found out that the information about the campaign was not reflected in the learning data used when learning the predictors. The operator conceives adding the information about the campaign to the learning data when updating the predictor for predicting the demand of each of these carbonated beverages in the store C. The prediction accuracy of the predictors can be improved in this way.

How the operator uses the scatter graph displayed by the GUI display unit 102 has been described above, using two examples. By referencing to the scatter graph displayed by the GUI display unit 102, the operator can first find a prediction target (predictor) of particular interest from among a large number of prediction targets (predictors). Then, by selecting the symbol representing the prediction target of particular interest, the operator can obtain detailed information on the prediction target or the predictor for predicting the prediction target. Thus, the operator can perform drill down analysis on a large number of predictors from overview to greater detail, through the use of the scatter graph displayed by the GUI display unit 102. This contributes to efficient maintenance of a large number of predictors.

Exemplary Embodiment 2

Exemplary Embodiment 1 describes the method whereby the GUI display unit 102 generates the scatter graph with the predictor-related index (update frequency) and the prediction target-related index (sales amount) being set in the respective dimensional axes so as to make the statuses of the prediction targets predicted by the predictors recognizable. In this exemplary embodiment, the predictor visualization system generates such a scatter graph that makes the statuses of the predictors recognizable.

Figure 15:
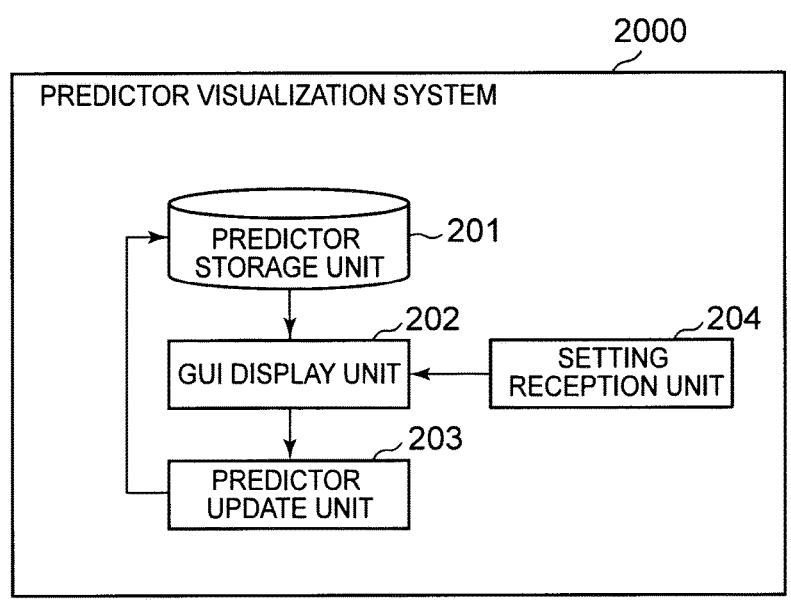
FIG. 15 is a block diagram depicting an example of the structure of Exemplary Embodiment 2 of a predictor visualization system according to the present invention.

FIG. 15 is a block diagram depicting an example of the structure of Exemplary Embodiment 2 of a predictor visualization system according to the present invention. A predictor visualization system 2000 in this exemplary embodiment is a system that performs prediction or prediction using a large number of predictors (prediction expressions), as in Exemplary Embodiment 1. Thus, the predictor visualization system 2000 in this exemplary embodiment also performs prediction or prediction, and so also be referred to as a prediction system or a prediction system.

The predictor visualization system 2000 in this exemplary embodiment includes a predictor storage unit 201, a GUI display unit 202, a predictor update unit 203, and a setting reception unit 204.

The predictor storage unit 201 stores a list of predictors included in the predictor visualization system 2000. The predictor storage unit 201 stores each predictor and a predictor-related index in association with each other. The predictor-related index is, for example, update results such as update time or frequency or performance indicating prediction accuracy such as error mean, error variance, or error ratio, as in Exemplary Embodiment 1. The predictor storage unit 201 may store the number of pieces of learning data used when learning the predictor or the goodness of fit of the predictor to the learning data, as the predictor-related index. For example, in the case of generating a predictor by linear regression on learning data, the goodness of fit of the predictor to the learning data is the value of determination coefficient or the value of error between the learning data and the regression equation. The predictor storage unit 201 stores, for example, each predictor (regression equation), the number of samples of learning data used when learning the predictor, and the value of error between the learning data and the regression equation when learning the predictor, in association with each other.

The GUI display unit 202 visualizes the information stored in the predictor storage unit 201, as in Exemplary Embodiment 1. In detail, the GUI display unit 202 generates a scatter graph in which a symbol representing each predictor is located in a coordinate space, based on the information stored in the predictor storage unit 201. Here, the symbol representing each predictor is located in such a coordinate space where a predictor-related index is defined as at least one dimension.

Figure 16:
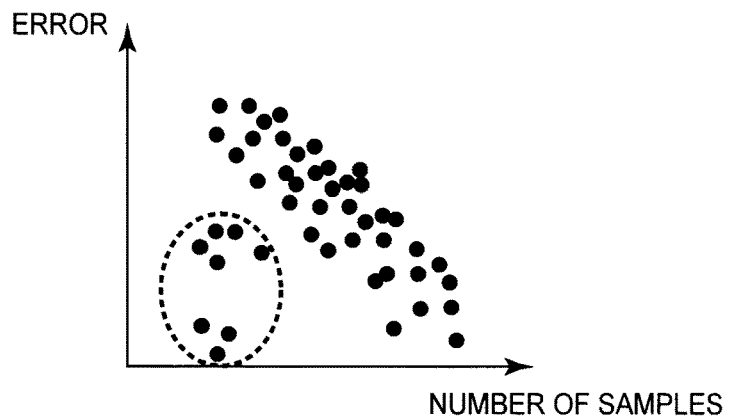
FIG. 16 is an explanatory diagram depicting an example of a scatter graph.

FIG. 16 is an explanatory diagram depicting an example of the scatter graph generated by the GUI display unit 202. In the example depicted in FIG. 16, the number of samples of learning data used when generating the predictor is defined in the horizontal dimensional axis, and the value of error between the learning data and the regression equation is defined in the vertical dimensional axis in the coordinate space. One symbol in a black circle shape in FIG. 16 represents one predictor in the coordinate space. The indexes set in the respective axes are not limited to those in FIG. 16. Moreover, the number of dimensions of the scatter graph is not limited to two, and the scatter graph may be multidimensional such as three-dimensional, as in Exemplary Embodiment 1.

Although FIG. 16 depicts an example where the GUI display unit 202 generates the scatter graph in which the symbol representing each predictor has the same shape in the coordinate space, the GUI display unit 202 may arrange, in the coordinate space, the symbol changed depending on information related to the predictor. For example, the GUI display unit 202 may express the type or classification of each predictor by symbol shape or color. The GUI display unit 202 may also express quantity information related to each predictor by symbol size.

As a result of the GUI display unit 202 generating the scatter graph representing the statuses of the predictors in this way, the tendency of the distribution of the predictors is recognizable at a glance. Thus, the statuses of a large number of predictors can be recognized easily. For example, the predictors within the dotted circle on the lower left of the scatter graph in FIG. 16 have a low value of error between the learning data and the regression equation despite a small number of samples. From this, the possibility of overfitting of the predictors within this range can be investigated.

Overfitting is a phenomenon of an increase in generalization error (error in the entire population other than learning data) due to excessive fitting of a predictor (e.g. regression equation) to learning data. The use of the scatter graph depicted in FIG. 16 enables efficient discovery of any predictor having a high possibility of overfitting immediately after learning. Moreover, for example by generating such a scatter graph that has the error during this month and the error during learning as two axes or a scatter graph that has the learning error and the validation error (past data not used as learning data) as two axes, any predictor having a high possibility of overfitting can be discovered during predictor operation.

The GUI display unit 202 displays the generated scatter graph. The method of generating the scatter graph is the same as that in Exemplary Embodiment 1.

The predictor update unit 203 updates a predictor to be updated, and stores the updated predictor in the predictor storage unit 201. The method of updating the predictor is the same as that in Exemplary Embodiment 1. The GUI display unit 202 receives a selection instruction for a symbol of a predictor in the generated scatter graph. The predictor update unit 203 may specify the predictor for which the GUI display unit 202 has received the selection, as the update target. In this case, predictors having the same tendency can be specified together, so that the load of the operator issuing an update instruction individually for each predictor can be reduced.

The setting reception unit 204 receives a setting of which information is to be displayed by the GUI display unit 202, from the operator. The setting received by the setting reception unit 204 is the same as that received by the setting reception unit 104 in Exemplary Embodiment 1.

The GUI display unit 202, the predictor update unit 203, and the setting reception unit 204 are realized by a CPU in a computer operating according to a program (predictor visualization program). Alternatively, the GUI display unit 202, the predictor update unit 203, and the setting reception unit 204 may each be realized by dedicated hardware.

Figure 17:
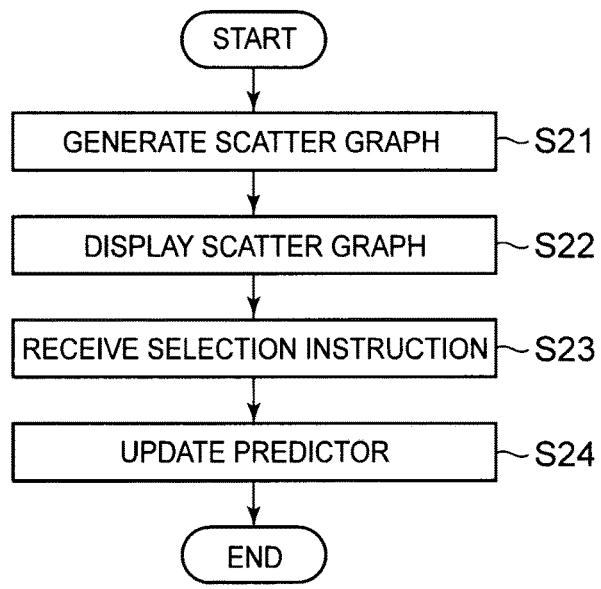
FIG. 17 is a flowchart depicting an example of the operation of the predictor visualization system in Exemplary Embodiment 2.

The following describes the operation of the predictor visualization system in this exemplary embodiment. FIG. 17 is a flowchart depicting an example of the operation of the predictor visualization system in this exemplary embodiment.

The GUI display unit 202 reads information related to predictors from the predictor storage unit 201, and generates a scatter graph (step S21). In detail, the GUI display unit 202 generates the scatter graph in which a symbol representing each predictor is located in a coordinate space where a predictor-related index is defined as at least one dimension, based on the information stored in the predictor storage unit 201.

The GUI display unit 202 displays the generated scatter graph (step S22). The GUI display unit 202 receives a selection instruction for any symbol in the scatter graph (step S23). Here, the GUI display unit 202 may receive a range selection instruction. The predictor update unit 203 updates the predictor corresponding to the symbol of the selection received by the GUI display unit 202, and stores the updated predictor in the predictor storage unit 201 (step S24).

As described above, in this exemplary embodiment, based on an index related to each predictor stored in the predictor storage unit 201, the GUI display unit 202 generates a scatter graph in which a symbol representing each predictor is located at the position determined by the predictor-related index in a coordinate space where the predictor-related index is defined as at least one dimension. Thus, the statuses of a large number of predictors can be visualized in an easily recognizable manner, enabling efficient operation of a large number of predictors.

Figure 18:
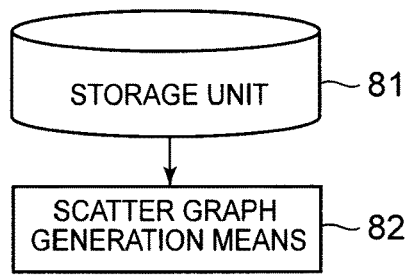
FIG. 18 is a block diagram schematically depicting a predictor visualization system according to the present invention.

The following describes an overview of the present invention. FIG. 18 is a block diagram schematically depicting a predictor visualization system according to the present invention. A predictor visualization system according to the present invention includes a storage unit 81 (e.g. the predictor storage unit 101) which stores information associating each of a plurality of prediction targets (e.g. products of each store) with a predictor-related index (e.g. update result) related to a predictor for predicting the prediction target; and scatter graph generation means 82 (e.g. the GUI display unit 102) which generates, based on the information stored in the storage unit 81, a scatter graph in which a symbol representing the prediction target of the predictor is located at a position determined by the predictor-related index (specifically, the index related to the predictor for predicting the prediction target) in a coordinate space where the predictor-related index is defined as at least one dimension.

With such a structure, the statuses of a large number of predictors can be visualized in an easily recognizable manner.

The predictor visualization system may include symbol selection instruction reception means (e.g. the GUI display unit 102, the GUI display unit 202) which receives an instruction to select a symbol in the scatter graph; and output means (e.g. the GUI display unit 102, the GUI display unit 202) which outputs at least one of information related to a prediction target corresponding to the selected symbol and information related to a predictor for predicting the prediction target, on a screen. With such a structure, information on predictors or prediction targets having the same tendency can be recognized together.

The symbol selection instruction reception means may receive an instruction to select a range of one or more symbols in the scatter graph, and the output means may output at least one of information related to a prediction target corresponding to each symbol included in the selected range and information related to a predictor for predicting the prediction target, on the screen.

The predictor visualization system may include setting reception means (e.g. the setting reception unit 104, the setting reception unit 204) which receives a setting for information to be output as the information for the symbol, and the output means may output the information for which the setting reception means receives the setting, as the information for the symbol included in the range selected by the symbol selection instruction reception means.

The scatter graph generation means 82 may set, for each symbol representing the prediction target of the predictor, a link to at least one of information related to the prediction target corresponding to the symbol and information related to the predictor for predicting the prediction target.

The storage unit 81 may store information associating each of the plurality of prediction targets with a prediction target-related index (e.g. sales amount) related to the prediction target, and the scatter graph generation means 82 may generate the scatter graph in which the symbol representing the prediction target of the predictor is located at a position determined by the predictor-related index and the prediction target-related index in a coordinate space where the predictor-related index is defined as one dimension and the prediction target-related index is defined as another dimension.

In detail, the predictor-related index may be an index indicating an update result (e.g. time of updating the predictor, the number of updates of the predictor) or frequency (e.g. update frequency) of the predictor or an index indicating prediction accuracy of the predictor. The prediction target-related index may be, for example, an index related to importance, priority, or sales amount of the prediction target.

The storage unit 81 may store an index related to a time or frequency of updating the predictor, as the predictor-related index, and the scatter graph generation means 82 may generate the scatter graph in which the symbol representing the prediction target of the predictor is located at a position determined by an index indicating an update result of the predictor in a coordinate space where the index indicating the update result of the predictor is defined as at least one dimension.

The predictor visualization system may include range selection instruction reception means (e.g. the GUI display unit 102) which receives an instruction to select a range of one or more symbols in the scatter graph; and update means (e.g. the predictor update unit 103) which updates a predictor for predicting a prediction target corresponding to each symbol included in the selected range. With such a structure, predictors or prediction targets having the same tendency can be specified together, so that the load of the operator issuing an update instruction individually for each predictor can be reduced.

The following describes another overview of the present invention. The predictor visualization system described below has the same structure as that in FIG. 18. In detail, another predictor visualization system according to the present invention includes: a storage unit 81 (e.g. the predictor storage unit 201) which stores information associating each of a plurality of predictors with an predictor-related index (e.g. error ratio, the number of samples) related to the predictor; and scatter graph generation means 82 (e.g. the GUI display unit 202) which generates, based on the information stored in the storage unit 81, a scatter graph in which a symbol representing the predictor is located at a position determined by the predictor-related index in a coordinate space where the predictor-related index is defined as at least one dimension.

With such a structure, too, the statuses of a large number of predictors can be visualized in an easily recognizable manner.

The following describes an example of a reference aspect.
(Supplementary Note 1)

A predictor visualization system including: a storage unit which stores information associating each of a plurality of prediction targets with a predictor-related index related to a predictor for predicting the prediction target; and scatter graph generation means which generates, based on the information stored in the storage unit, a scatter graph by plotting at a position determined by the predictor-related index in a coordinate space where the predictor-related index is defined as at least one dimension.

REFERENCE SIGNS LIST 101, 201 predictor storage unit
102, 202 GUI display unit
103, 203 predictor update unit
104, 204 setting reception unit
1000, 2000 predictor visualization system

The invention claimed is:

1. A predictor visualization system comprising:
hardware including a processor;
a storage unit which stores information associating each of a plurality of prediction targets with a predictor-related index related to a predictor for predicting the prediction target; and
a scatter graph generation unit implemented at least by the hardware and which generates, based on the information stored in the storage unit, a scatter graph in which a symbol representing the prediction target of the predictor is located at a position determined by the predictor-related index in a coordinate space where the predictor-related index is defined as at least one dimension,
wherein the predictor-related index indicates at least one of a prediction accuracy, an update time of the predictor, and an operation time representing a duration from a previous update to a present time,
wherein the predictor-related index includes at least both the prediction accuracy of the predictor and a predictor update, and
wherein the scatter graph generation unit generates the scatter graph in which symbols, including the symbol, are arranged in the coordinate space in which the dimension is defined by at least both the prediction accuracy of the predictor and the predictor update.

2. The predictor visualization system according to claim 1, comprising
a symbol selection instruction reception unit implemented at least by the hardware and which receives an instruction to select at least one of the symbols in the scatter graph; and
an output unit implemented at least by the hardware and which outputs at least one of information related to a prediction target corresponding to the selected symbol and information related to a predictor for predicting the prediction target, on a screen.

3. The predictor visualization system according to claim 2, wherein the symbol selection instruction reception unit receives an instruction to select a range of one or more of the symbols in the scatter graph, and
wherein the output unit outputs at least one of information related to a prediction target corresponding to each symbol included in the selected range and information related to a predictor for predicting the prediction target, on the screen.

4. The predictor visualization system according to claim 3, comprising
a setting reception unit implemented at least by the hardware and which receives a setting for information to be output as the information for the symbol,
wherein the output unit outputs the information for which the setting reception unit receives the setting, as the information for the symbol included in the range selected by the symbol selection instruction reception unit.

5. The predictor visualization system according to claim 1, wherein the scatter graph generation unit sets, for each symbol representing the prediction target of the predictor, a link to at least one of information related to the prediction target corresponding to the symbol and information related to the predictor for predicting the prediction target.

6. The predictor visualization system according to claim 1, wherein the storage unit stores information associating each of the plurality of prediction targets with a prediction target-related index related to the prediction target, and
wherein the scatter graph generation unit generates the scatter graph in which the symbol representing the prediction target of the predictor is located at a position determined by the predictor-related index and the prediction target-related index in a coordinate space where the predictor-related index is defined as one dimension and the prediction target-related index is defined as another dimension.

7. The predictor visualization system according to claim 6, wherein the prediction target-related index is an index related to importance, priority, or sales amount of the prediction target.

8. The predictor visualization system according to claim 1, wherein the predictor-related index is an index indicating an update result or frequency of the predictor or an index indicating prediction accuracy of the predictor.

9. The predictor visualization system according to claim 1, wherein the storage unit stores an index related to a time or frequency of updating the predictor, as the predictor-related index, and
wherein the scatter graph generation unit generates the scatter graph in which the symbol representing the prediction target of the predictor is located at a position determined by an index indicating an update result of the predictor in a coordinate space where the index indicating the update result of the predictor is defined as at least one dimension.

10. The predictor visualization system according to claim 1, comprising
a range selection instruction reception unit implemented at least by the hardware and which receives an instruction to select a range of one or more of the symbols in the scatter graph; and
an update unit implemented at least by the hardware and which updates a predictor for predicting a prediction target corresponding to each symbol included in the selected range.

11. A predictor visualization method comprising
generating, based on information that is stored in a storage unit and associates each of a plurality of prediction targets with a predictor-related index related to a predictor for predicting the prediction target, a scatter graph in which a symbol representing the prediction target of the predictor is located at a position determined by the predictor-related index in a coordinate space where the predictor-related index is defined as at least one dimension,
wherein the predictor-related index indicates at least one of a prediction accuracy, an update time of the predictor, and an operation time representing a duration from a previous update to a present time,
wherein the predictor-related index includes at least both the prediction accuracy of the predictor and a predictor update, and
wherein the scatter graph generation unit generates the scatter graph in which symbols, including the symbol, are arranged in the coordinate space in which the dimension is defined by at least both the prediction accuracy of the predictor and the predictor update.

12. The predictor visualization method according to claim 11, comprising
receiving an instruction to select at least one of the symbols in the scatter graph; and
outputting at least one of information related to a prediction target corresponding to the selected symbol and information related to a predictor for predicting the prediction target, on a screen.

13. A non-transitory computer readable information recording medium storing a predictor visualization program, when executed by a processor, that performs a method for generating, based on information that is stored in a storage unit and associates each of a plurality of prediction targets with a predictor-related index related to a predictor for predicting the prediction target, a scatter graph in which a symbol representing the prediction target of the predictor is located at a position determined by the predictor-related index in a coordinate space where the predictor-related index is defined as at least one dimension,
wherein the predictor-related index indicates at least one of a prediction accuracy, an update time of the predictor, and an operation time representing a duration from a previous update to a present time,
wherein the predictor-related index includes at least both the prediction accuracy of the predictor and a predictor update, and
wherein the scatter graph generation unit generates the scatter graph in which symbols, including the symbol, are arranged in the coordinate space in which the dimension is defined by at least both the prediction accuracy of the predictor and the predictor update.

14. The non-transitory computer-readable recording medium predictor according to claim 13, receiving an instruction to select at least one of the symbols in the scatter graph; and
outputting at least one of information related to a prediction target corresponding to the selected symbol and information related to a predictor for predicting the prediction target, on a screen.

* * * * *